July 15, 1930. L. E. WILLIAMS 1,770,503
CURTAIN COVER FOR DUMPING BODIES
Filed Dec. 23, 1927 3 Sheets-Sheet 3
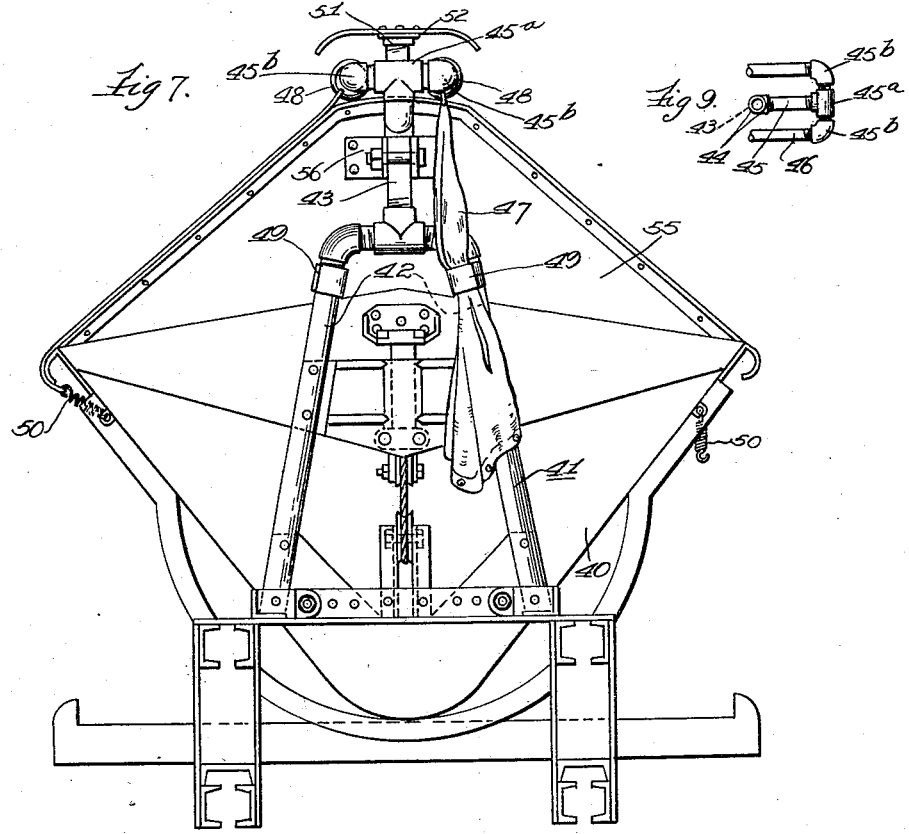
Inventor.
Leroy E. Williams.
by his Attorneys.

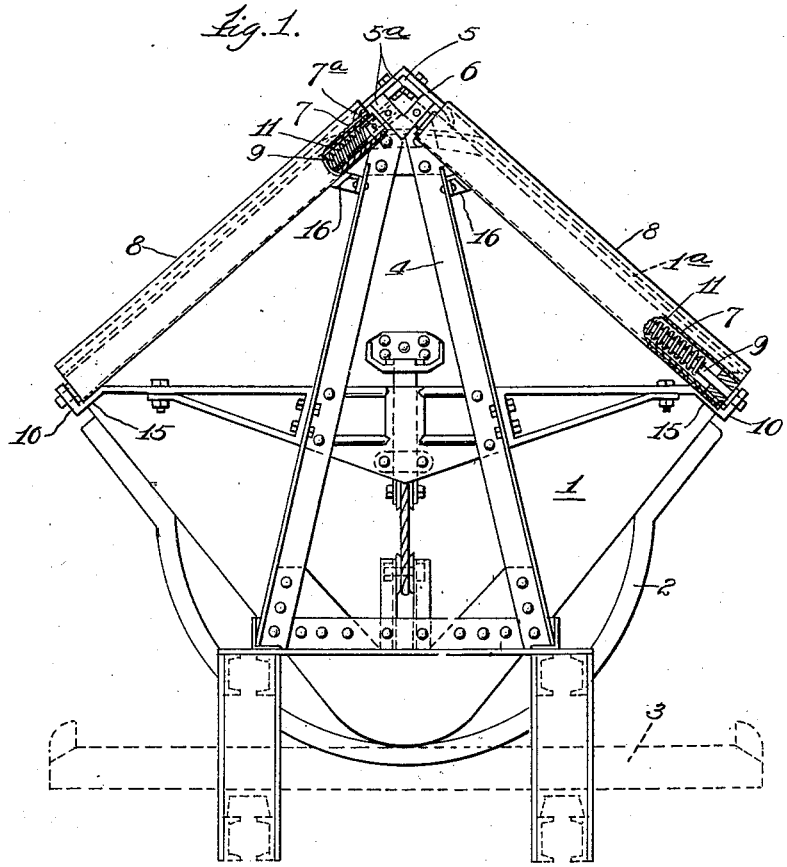
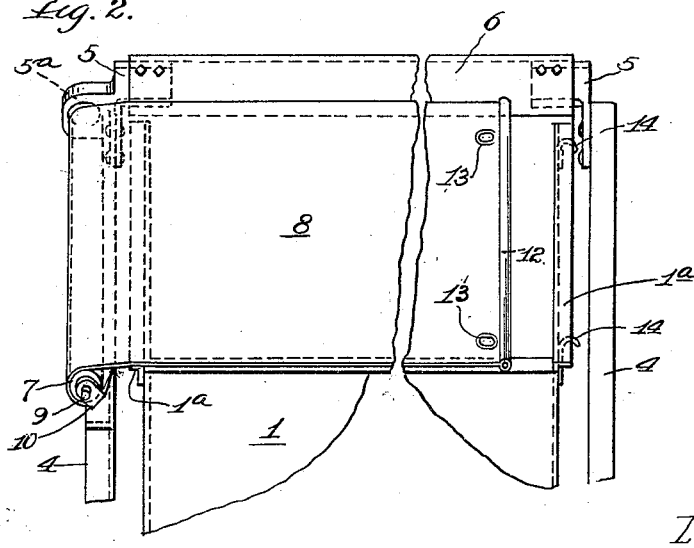

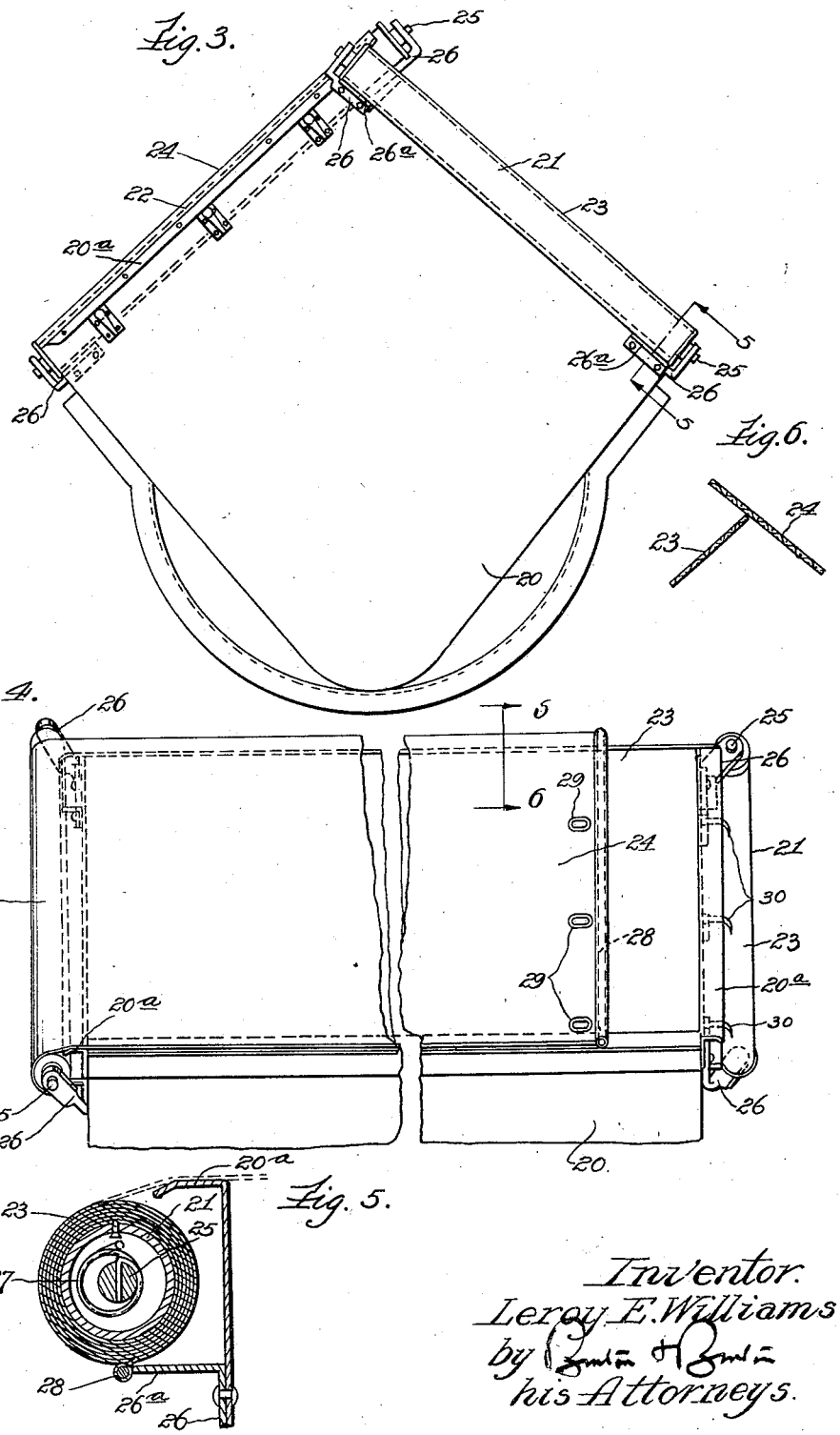

Patented July 15, 1930

1,770,503

UNITED STATES PATENT OFFICE

LEROY E. WILLIAMS, OF EDGERTON, WISCONSIN, ASSIGNOR TO HIGHWAY TRAILER COMPANY, OF EDGERTON, WISCONSIN, A CORPORATION OF WISCONSIN

CURTAIN COVER FOR DUMPING BODIES

Application filed December 23, 1927. Serial No. 242,022.

This invention relates to a dumping body of the type designed to tilt or roll laterally for discharging its load, and more particularly to covering means for enclosing the load carrying space of the body. The primary object of the present invention is to provide a cover of improved, simplified construction which may be economically manufactured.

Another object of this invention is to provide covering means of flexible material arranged to be longitudinally extended over the load-carrying space of the body.

A further object is to provide two or more flexible covers each adapted to enclose a substantial portion of the load-carrying space of the body and operable independently of each other to expose a portion of said load-carrying space at will. The invention consists in certain features and elements of construction, as herein shown and described as indicated by the claims.

In the drawings:

Figure 1 is a diagrammatic end view of a vehicle body equipped with covers embodying this invention.

Figure 2 is a partial side elevation of a vehicle body having the improved covers mounted in position.

Figure 3 is a somewhat diagrammatic end view of a vehicle body provided with covers of a modified construction.

Figure 4 is a partial side elevation of body and covers shown in Figure 3.

Figure 5 is a transverse section through a roller with a flexible cover wound thereon, taken at the line 5—5 on Figure 3.

Figure 6 is a vertical section taken at the line 6—6 on Figure 4, showing the overlapping of the flexible cover portion along the longitudinal center of the body.

Figure 7 is a diagrammatic end view of a vehicle body provided with covering means of a further modification.

Figure 8 is a partial side elevation of the body and covers shown in Figure 7.

Figure 9 is a fragmentary detail plan view of an end of the curtain supporting frame.

In Figure 1 of the drawings, an upwardly open vehicle body is indicated at 1, provided with the usual curved rockers, 2, mounted on transverse cross rails, 3, of the vehicle frame, so that the body may be rolled toward either side for discharging its load. In this construction the covers for the body are carried independently of said body so as not to alter its center of gravity in any respect. It is of course to be understood that the vehicle is provided with the usual mechanism for locking the body in upright position and a description thereof is unnecessary as it forms no part of the present invention.

A pair of upwardly extending A-frames, 4, are mounted on the vehicle frame adjacent the opposite ends of the body and are provided with supporting brackets, 5, at their upper ends, to which is secured an angle iron ridge pole, 6, extending longitudinally over the load-carrying space of the body. The angle formed by the legs of this ridge pole is about equal to that formed by the upwardly converging edges of the body ends, and said legs lie within substantially the same planes as said edges. A pair of roller, 7—7, are supported in oppositely inclined positions on one of the end frames, 4, each roller having a flexible cover, 8, secured and wound thereon and yieldably extensible over the load-carrying space of the body toward the opposite end thereof. These rollers are mounted on shafts, 9, fixed at their lower ends in brackets, 10, connected adjacent the center of the A-frame, 4, the upper ends of said shafts having support in the extension, 5ª, of the end bracket, 5. Coil springs, 11, encircle said shafts, having one end secured thereto, while the opposite end is attached to a plug, 7ª, in the end of the roller. Thus it will be clear that the roller with its flexible cover functions in a manner somewhat similar to the usual type of window shade, and at all times when said cover is in extended body covering position, the spring of the roller exerts sufficient tension to hold the cover taut.

The rollers are positioned parallel to and slightly below the upper edge of the body end so that the flanged edge, 1ª, of said body serves to guide the cover in body covering position and partially relieves any tendency to sag. The free end of each cover is provided with a reenforcing member, 12, affording a convenient means for grasping the cover for pulling it over the body. The cover is also provided with eyelets, 13, adjacent said member for registration with hook members, 14, on the opposite end of the body for securing said cover in extended position. It is to be noted that the rollers are so positioned that the covers when extended overlap the respective leg portions of the shed, 6, to completely enclose the body. Each bracket, 10, is provided with a bent portion, 15, aligned parallel to and adjacent the roller and in a position to engage the member, 12, of the cover as it winds on the roller to stop the rotation of the same. Additional roller stopping brackets, 16, are connected to the upper part of the A-frame and aligned for engaging the upper end of the reenforcing member, 12, in a like manner.

In the modification illustrated in Figures 3 to 6, a body is indicated at 20, adapted for rolling laterally in the usual manner for discharging its load. In this construction the covers are mounted so as to be carried with the body during dumping operations. Two oppositely inclined rollers, 21 and 22, are mounted on opposite ends of the body, each having a flexible cover, 23 and 24, respectively, adapted for yieldable extension longitudinally over opposite portions of the load-carrying space of the body. These rollers are provided with shafts, 25, fixed in brackets, 26, secured to the ends of the body and so positioned that the rollers lie parallel to and slightly below the respective upwardly inclined edges of the adjacent ends of the body. Coil springs, 27, are secured to the shafts and rollers in the usual way so that the roller exerts tension on the cover in its body covering position for taking up slack or sag. The flanges, 20$^a$, at the top of the ends of said body serve to guide the covers on and off their rollers and also help to keep said covers taut.

The free ends of the covers are provided with stiffening bars, 28, to facilitate drawing the covers across the body and also to act as stop means when the covers are wound back on the rollers. Each of the brackets, 26, is formed with a transverse leg, 26$^a$, positioned adjacent the roller and in line to engage the bar, 28, as shown in Figure 5. Eyelets, 29, are provided in the covers at the free ends for the hook members, 30, on the opposite ends of the body for holding the cover in outstretched position.

As shown in Figure 3, the roller, 22, with its respective cover, 24, extends upwardly slightly above the roller, 21, with its cover, 23, and is positioned so as to cause overlapping of the cover edges (as shown in Figure 6) to form a substantially complete closure for the body. It will be seen that in dumping operations, it will be necessary to open only the cover on the side toward which the body will be dumped.

Figures 7 and 8 show a further modification of my invention in which a dump body, 40, is mounted in the usual manner for rolling laterally to discharge its load. A pair of upright frames, 41, are mounted on the vehicle frame at opposite ends of the body. These frames may be of any suitable construction, herein shown as formed of spaced pipe members, 42, terminating in a closed loop slightly above the lateral edges of the body. An upright extension, 43, is connected centrally with respect to said looped end, the upper end thereof having a fitting, 44, carrying a horizontal pipe member, 45, extending centrally of and away from the body; the end of said member, 45, being provided with a T fitting, 45$^a$, carrying oppositely extending transverse terminal members, 45$^b$, to which are connected in spaced relation, a pair of pipes, 46 extending longitudinally over the load-carrying space of the body. Longitudinally extensible flexible cover portions, 47, for opposite sides of the body are provided at their upper edges with a plurality of rings, 48, slidably mounted on said pipes, 46. It will be understood that the curtain supporting frame may be constructed so that the pipes, 46, are bent at their ends to form the terminal members, 45$^b$. As shown at the left hand end of the body in Figure 8, the cover, 47, may be gathered with the rings on the pipes adjacent the terminal portions, 45$^b$; however, the rings may be of sufficient size to pass over the elbow connections of said terminal portions to gather the curtain rearwardly of the end frame. Either arrangement permits free and unobstructed dumping action of the body. Spring hooks, 49, are mounted on the members, 42, so that the gathered covers may be secured to the upright frame out of the dumping path of the body. Spring fasteners, 50, are mounted on the body sides and are adapted to engage the cover portions when extended over the load-carrying space of the body to hold the same in position. As shown in the drawings, the cover for each side may be made up of two portions, longitudinally extensible toward the center of the body, if desired.

A plug, 51, is secured on the upper end of the fitting, 44, for supporting the opposite ends of a longitudinally extending shed, 52, which overlaps the space intermediate said pipes, 46, to form a complete closure for the body. Further support for the shed may be provided by T-fittings, 53, disposed about the longitudinal center of pipes, 46, carrying plugs, 54, secured to said shed. The upper end plate, 55, of the body may be either stationary or movable with the body, and preferably as shown it is stationary, being secured to a bracket, 56, attached to the upright frames, minimizes the possibility of interference from the gathered covers during the dumping action of the body.

I claim:

1. In a vehicle, a main frame an upwardly open laterally tiltable dump body mounted thereon, a pair of transversely spaced rollers disposed outside the body and parallel to its upper edge, a longitudinally extensible flexible cover wound on each roller, said rollers being positioned so that each cover forms a closure for substantially half the body when stretched in extended position thereover, and yielding means tending to wind said covers onto the rollers.

2. In a vehicle, a main frame, an upwardly open laterally tiltable dump body mounted thereon, a pair of transversely spaced rollers mounted on said body, a longitudinally extensible flexible cover wound on each roller, said rollers being disposed at an angle inclined toward the center of the body so that the respective covers will be correspondingly inclined and each form a closure for substantially half the body when extended thereover.

3. In a vehicle, a main frame, an upwardly open laterally tiltable dump body mounted thereon, a roller journaled on each end of the body, said rollers being transversely offset from each other and disposed at an angle inclined toward the center of the body, a longitudinally extensible flexible cover wound on each roller adapted when extended over said body to be correspondingly inclined with the inner edge of one cover in abutting relation with the other cover to form a complete body closure.

LEROY E. WILLIAMS.